Sept. 16, 1958     K. A. KLINGLER     2,852,225
SELF-SEALING VALVE CONSTRUCTION
Filed June 4, 1954
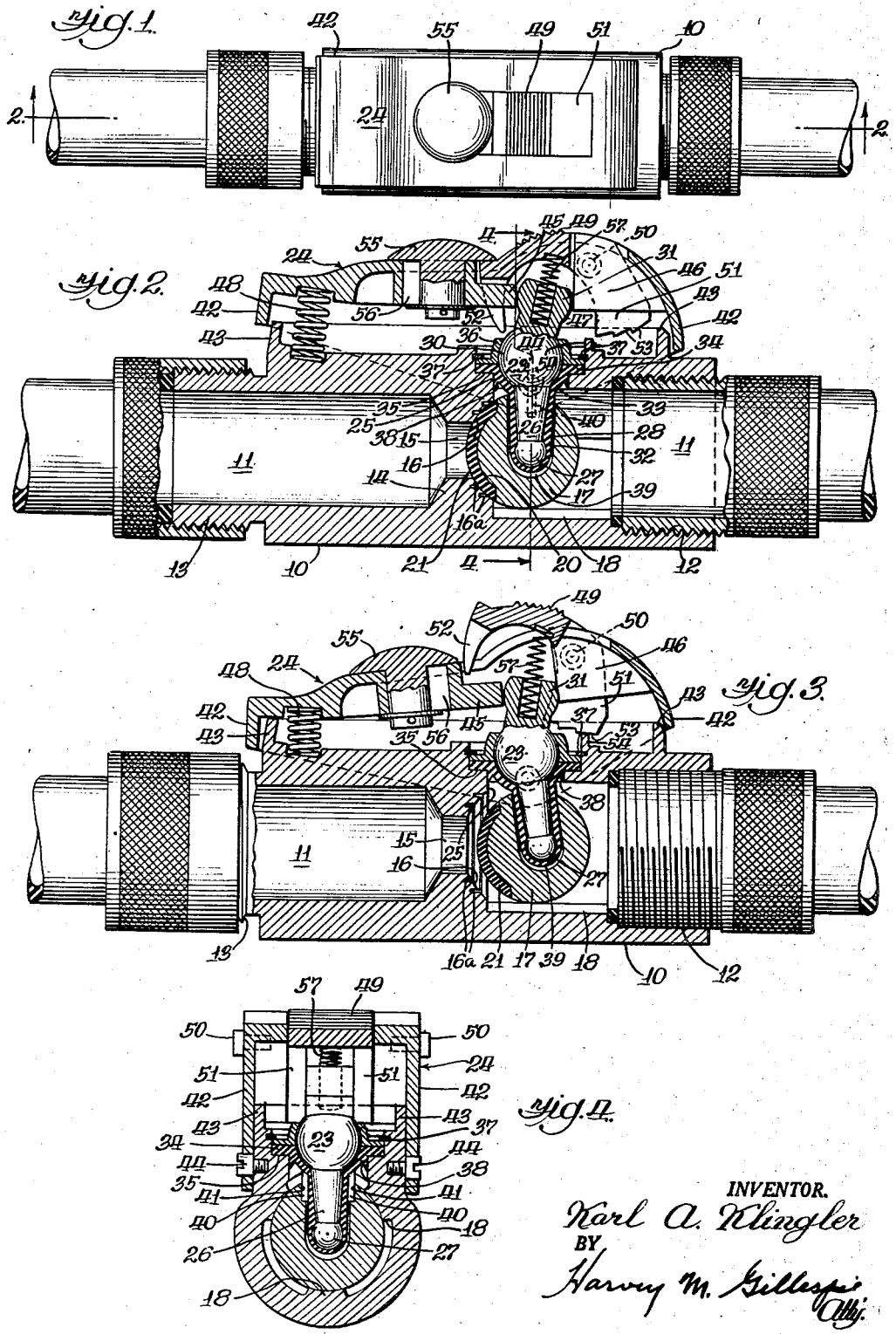
INVENTOR.
Karl A. Klingler
BY Harvey M. Gillespie
Atty.

United States Patent Office 2,852,225
Patented Sept. 16, 1958

2,852,225
SELF-SEALING VALVE CONSTRUCTION

Karl A. Klingler, Naperville, Ill.

Application June 4, 1954, Serial No. 434,410

8 Claims. (Cl. 251—109)

This invention relates to a self-sealing valve structure of the type shown and described in my co-pending application Serial No. 289,469, filed May 23, 1952, and is directed particularly to improvements on said structure in said co-pending application to simplify its structure and manufacture.

The valve structure shown in said application comprises essentially a resilient valve body or conduit section having a valve therein, an external actuator, and sealing means including a flexible pouch into which a portion of the actuator extends into the body and by means of which it is sealed with respect to the body and with respect to the fluid within the body.

According to the present invention, the body may be of rigid construction and the actuator is of improved design and includes a locking means therefor which upon being released is automatically operable to a series of positions, upon movement of the actuator to any desired position, to maintain the valve open. The locking means includes provisions whereby it may be positioned in any one of a series of positions to hold the actuator in an intermediate position and also includes latch means whereby the locking means may be disabled at will.

Still another feature of the invention resides in the provision of an improved form of valve element proper and an improved form of cooperating valve seat whereby a more effective sealing action may be attained between these parts.

The provision of a valve structure which is of compact design; one which is rugged and durable and which therefore is possessed of a long life; one which is comprised of a minimum number of moving parts and which therefore is unlikely to get out of order; one which is attractive in its design, and one which is otherwise well adapted to perform the services required of it, are further desirable features that have been borne in mind in the production and development of the invention.

In the accompanying drawing the invention is shown as being associated with a conventional garden hose and nozzle combination. However, other adaptations are obvious and are contemplated.

In these drawings:

Fig. 1 is a plan view of a valve structure embodying the invention;

Fig. 2 is an enlarged sectional view taken along the line 2—2 of Fig. 1;

Fig. 3 is a view similar to Fig. 2 showing the valve in open position; and

Fig. 4 is a sectional view taken along the line 4—4 of Fig. 2.

Referring now to the drawings, the improved valve structure comprises an open-ended valve casing 10 of cylindrical design having a central bore 11 interiorly threaded as at 12 at one end to receive the male end of a conventional hose section and exteriorly threaded as at 13 to receive a nozzle or other form of spray attachment or the female end of another hose section. The bore 11 is formed with a medially disposed annular rib 14 providing a valve port 15 and a conical seat 16 for a ball-type valve proper 17. A series of longitudinal grooves 18 are formed in the bore 11 on the pressure side of the seat 17 and provide spaced fluid channels through which fluid may pass around the valve 17 to the port 15 when the valve is moved from the seat 16.

The valve casing 10 is preferably of rigid material such as metal or a suitable plastic such as hard rubber and the valve proper 17 may be of a similar material. A surface region of the valve 17 is relieved as at 20 and a facing strip 21 of soft rubber or similar compressible material is bonded to the relieved area and is designed for sealing cooperation with the seat 16. A series of circular concentric grooves 16a are formed in the seat around the port 15 and assist in the provision of an effective seal when the valve 17 is seated.

The valve is actuated by means of a lever 23 and a handle form of actuator 24 therefor. The lever 23 projects through an opening 25 in the wall of the body 10 and has a finger portion 26 having a bulbous lower end 27 received in a radial off-center bore 28 formed in the body of the valve element 17. The lever 23 is formed with a medial spherical enlargement 30 and an upper stem 31.

In order to seal the lever and body against escape of fluid through the opening 25, the finger portion 26 is encased in a molded flexible tubular sealing member or pouch 32 having a seat portion 33 and an annular flange portion 34 seated on a ledge 35 surrounding the opening 25. A cap member 36 partially encompasses the enlargement 30 and serves to clamp the flange 34 against the ledge 35 and is held in clamping position by means of a snap ring 37. A thin annular skirt or rib 38 formed on the pouch 32 is designed for sealing engagement with the wall of the opening 25 under the expansive action of fluid, thus further insuring against egress of fluid through the opening. A slight clearance shown at 39 facilitates freedom of movement between the valve element and lever. A pair of opposed ribs 40 on the pouch 32 fit into slots 41 formed in the bore 28 and prevent turning movement of the valve 17 on the finger 26.

The actuator 24 is of inverted channel design with its side flanges arranged to overlap the portions of the side faces of the valve casing and upstanding flanges 43 formed on said casing so as to prevent the collection of foreign matter beneath the actuator handle. The side flanges 42—42 of said actuator handle are pivotally attached to the casing 10 by means of screw plugs 44. Formed within the channel portion of the actuator are ribs 45 and 46 which bear slidably on the curved opposite sides of an enlargement 47 formed at the upper end of the lever 23. The said ribs 45 and 46 engage the upper end of the lever 23 at a substantial distance above the pivotal axis of said lever and likewise a substantial distance above the pivotal axis 44 of the actuator. Consequently, the tilting of the actuator, by reason of the engagement of the ribs 45 and 46 with the lever 23, imparts fore and aft rocking movements to the lever and thereby moves the valve element 17 back and forward respectively with respect to the seat 16. A coil spring 48 is interposed between the valve casing 10 and the forward end of the handle portion of the actuator 24 and serves to urge the actuator to its normal position shown in Fig. 2. In this position the lower part of the lever 23 will assume a substantially vertical position and the valve element 17 will be pressed by the action of the spring 48 and also by the pressure of fluid within the portion of the chamber 11 at the right of the valve as illustrated in Fig. 2. The compressible facing strip 21 bearing against the valve seat 16 and being pressed slightly into the circular recesses 16a will hold the valve closed so as to prevent any discharge or drip of fluid. When there is no pressure within the bore 11 at the high pressure side of the valve 17 the valve will be held closed by means of the pressure exerted by the spring 48.

The actuator 24 is of the "squeeze-type." However, means are provided whereby the said actuator can be locked in various postions and thereby maintain the valve open. In order to hold the valve 17 in various predetermined positions, an angular locking element 49 is pivotally supported on the actuator 24 by means of a pivot pin 50. One end of the angular locking element is bifurcated so as to form depending portions 51—51 which embrace the rib 46 formed on the actuator. The other end of the locking element 49 is bifurcated to provide depending fingers 52 which embrace the lever engaging rib 45. The depending bifurcated ends 51—51 of the said locking element are provided at their lower ends with a series of notches 53 providing a vertical shoulder adapted, under conditions hereinafter mentioned, to abut against a rib 54 formed on the casing 10 and extending upwardly therefrom. The said locking element 49 is normally held in the position indicated in Fig. 2 by means of a latch element 55 which is slidably mounted in a slot 56 formed in the actuator 24 so that when it is moved to the position shown in Fig. 2, it will overlie the forward end of the pivoted locking element 49. A coil spring 57 seats in a bore formed in the upper end of the lever 23 and bears against the under-surface of the locking element 49. When the latch 55 is moved to the position shown in Fig. 3 to release the forward end of the locking element the force exerted by the spring 57 rocks the locking element 49 about its pivot 50 in a clockwise direction and thereby brings the vertical portion of one of said notches 53 into engagement with the transverse rib 54 and with the horizontal portion of the notch overlying the top surface of said rib 54. The several notches 53 of the locking element 49 will move into engagement with the said rib 54 as the handle of the actuator is depressed to different positions. For example, if the handle is depressed only slightly, the first notch will engage the rib 54. If the handle is depressed further, the locking element, as a whole, is moved upwardly by the tilting movement of the actuator lever so as to release its holding engagement with the rib 54 and thereby permit the locking element to move about its pivotal axis 50 to bring the next successive notch into holding engagement with the rib 54. When the notched end of the locking element is engaged with the rib 54 in the manner just described the actuating handle is held against reverse or clockwise movement, and, consequently, the valve 17 is held open.

In order to release the holding member 49 from its engagement with the rib 54 and thereby permit the actuator 24 and the valve 17 to return to the positions indicated in Fig. 2, it is necessary to manually depress the forward end of the holding element to a position whereby the latch 55 can be moved into a position overlying the forward end of the locking element as shown in Fig. 2.

When the locking element 49 is restored to the position shown in Fig. 2 and the latch element 55 engaged over the forward edge thereof, the locking element is completely disabled and the actuator handle may be depressed and released at will to open and close the valve 17.

While the invention has been described herein in connection with certain preferred embodiments, it will be obvious to persons familiar with the art that variations in the structure may be made without departing from the spirit of the invention. It should be understood, therefore, that the invention contemplates all modification in structure coming within the scope of the appended claims.

I do not claim herein the specific construction of the flexible pouch 32 whereby it is provided with a flange 34 for attachment to parts of the casing 10, an annular sealing skirt or rib 38 and the rib 40, since these constructions are claimed in my co-pending application Serial No. 372,246, filed August 4, 1953, now Patent No. 2,757,688.

I claim:

1. A self-sealing valve structure comprising a valve casing have a side wall provided with an opening therethrough and provided also with a portion having an axial bore therein defining a port for the passage of fluid, a valve element disposed in and slidably engaging said casing for movement into and out of port closing position, an operating lever swingably supported for movement about a medial axis and having one end extending through said opening in said side wall and loosely penetrating said valve element at a location within said casing to provide an operative connection therewith, an actuator pivoted to opposite walls of the casing for movement about an axis parallel to the pivotal axis of said operating lever but spaced therefrom and having a portion slidably embracing the outer end of said operating lever, whereby manual rocking of the actuator in one direction moves said operating lever and said valve element in a direction to open said port, flexible means surrounding a portion of said operating lever and secured to the casing at said opening to provide a fluid tight seal between said lever and said casing, a locking element pivoted to the actuator and having a locking end of a length greater than the distance between the pivotal axis of said locking element and a part of said casing, and yieldable means normally urging said locking element in a direction whereby different points of the locking end thereof will engage said part of the casing during progressive downward movements of the depressible end of the actuator to lock the actuator in various positions.

2. A self-sealing valve structure, according to claim 1 characterized by the provision of a latch element movably mounted on the actuator between a retracted position thereof wherein it is out of engagement with the locking element to an advanced position wherein it engages said locking element and maintains the same in an inoperative position wherein the locking end thereof is held out of engagement with said casing part.

3. A self-sealing valve structure, according to claim 2 characterized in that said latch member is slidable lengthwise of said actuator to a position overlying an end of said locking element.

4. A self-sealing valve structure according to claim 2 characterized in that said locking element is provided with portions of progressively increasing radii relative to its pivotal axis movable to various positions of engagement with said casing part to maintain the actuator in selected positions with respect to the casing.

5. A self-sealing valve structure according to claim 4 characterized in that said portions of the locking element which have progressively increasing radii relative to said pivotal axis are a series of notch surfaces spaced from each other and at different radial distances from the pivotal axis of the locking element.

6. A self-sealing valve structure according to claim 5 characterized in that the locking element is swingably pivoted intermediate its ends to the actuator and is provided with a foot portion eccentric to its pivotal axis engageable with a portion of said casing part to maintain the actuator in selected positions and means interposed between the operating lever and said locking element to automatically swing the latter into various locking positions when the actuator is moved in one direction about its axis.

7. A self-sealing valve structure according to claim 1 characterized in that the outer end of said operating lever is provided with curved forward and rear faces and in that the said portions of the actuator which embrace the outer end of said operating lever define opposed faces of a recess formed in said actuator.

8. A self-sealing valve structure comprising a valve casing having a side wall provided with an opening therethrough and provided also with a portion having an axial bore therein defining a port for the passage of fluid, a valve element disposed in and slidably engaging said casing for movement into and out of port closing position, an operating lever swingably supported for movement about a medial axis and having one end extending through said opening in said side wall and loosely penetrating said valve element at a location within said casing to provide an operative connection therewith, an actuator provided with opposite side portions which embracingly overlap the opposite side faces of said casing and are pivotally secured thereto for movement about an axis parallel to the pivotal axis of said operating lever but spaced therefrom and having a portion slidably embracing the outer end of said operating lever, whereby manual rocking of the actuator in one direction moves said operating lever and said valve element in a direction to open said port, and flexible means surrounding a portion of said operating lever and secured to the casing at said opening to provide a fluid tight seal between the said lever and said casing.

References Cited in the file of this patent

UNITED STATES PATENTS

| | | |
|---|---|---|
| 495,213 | Adams | Apr. 11, 1893 |
| 647,848 | Lange | Apr. 17, 1900 |
| 1,171,189 | Grandi | Feb. 8, 1916 |
| 1,318,120 | Wheaton | Oct. 7, 1919 |
| 1,427,148 | Brockmiller | Aug. 29, 1922 |
| 2,257,199 | Sloan | Sept. 30, 1941 |
| 2,262,062 | Strong | Nov. 11, 1941 |
| 2,313,128 | Densten | Mar. 9, 1943 |
| 2,578,362 | Kluver | Dec. 11, 1951 |
| 2,722,397 | Bruce | Nov. 1, 1955 |
| 2,723,831 | Ine | Nov. 15, 1955 |

FOREIGN PATENTS

| | | |
|---|---|---|
| 100,089 | Sweden | Oct. 22, 1940 |